Figure 1:
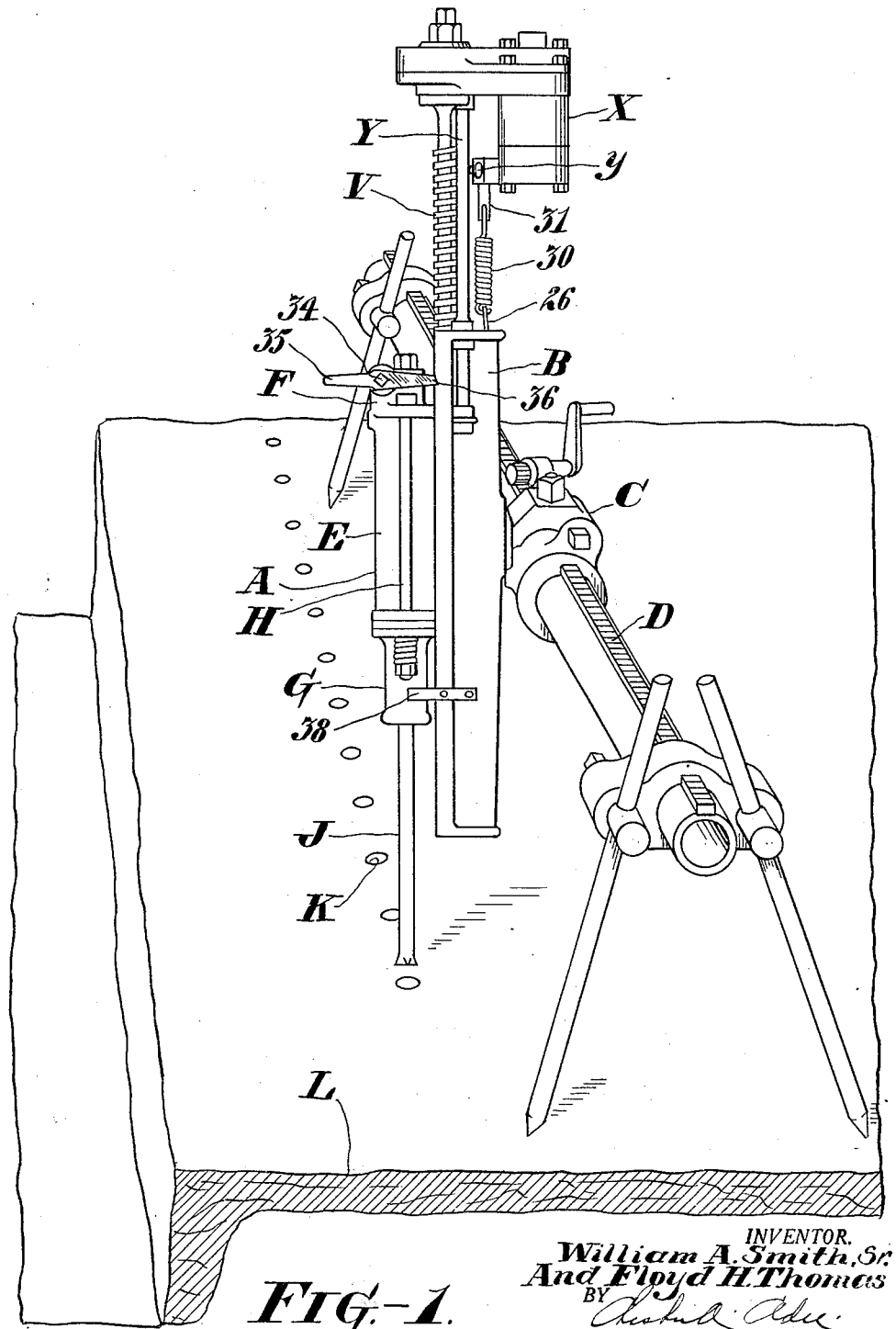

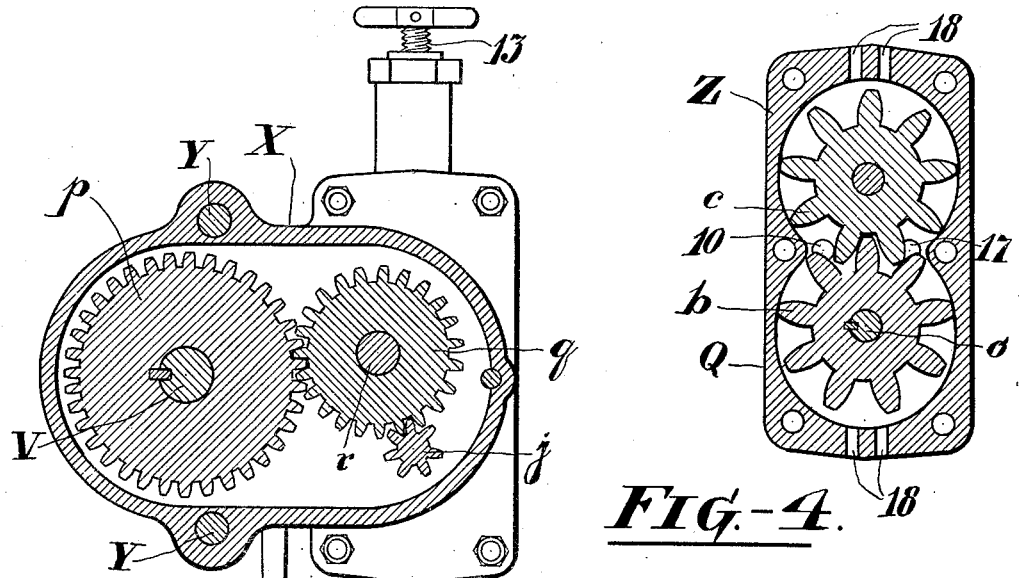
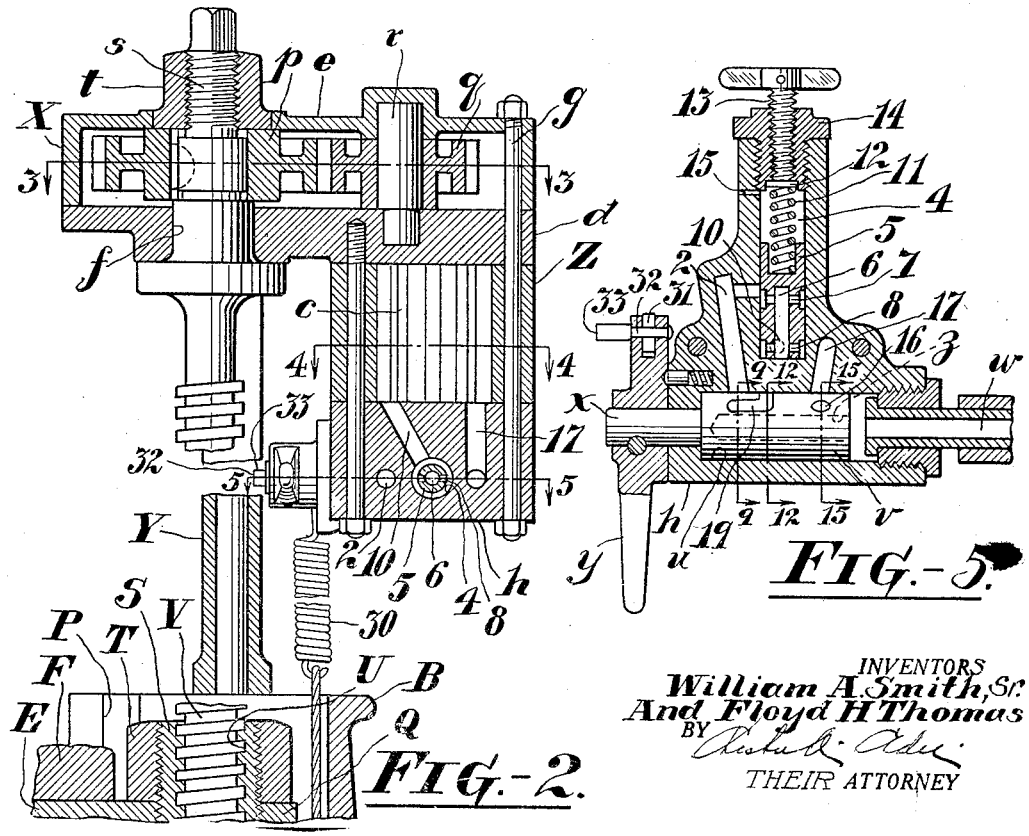

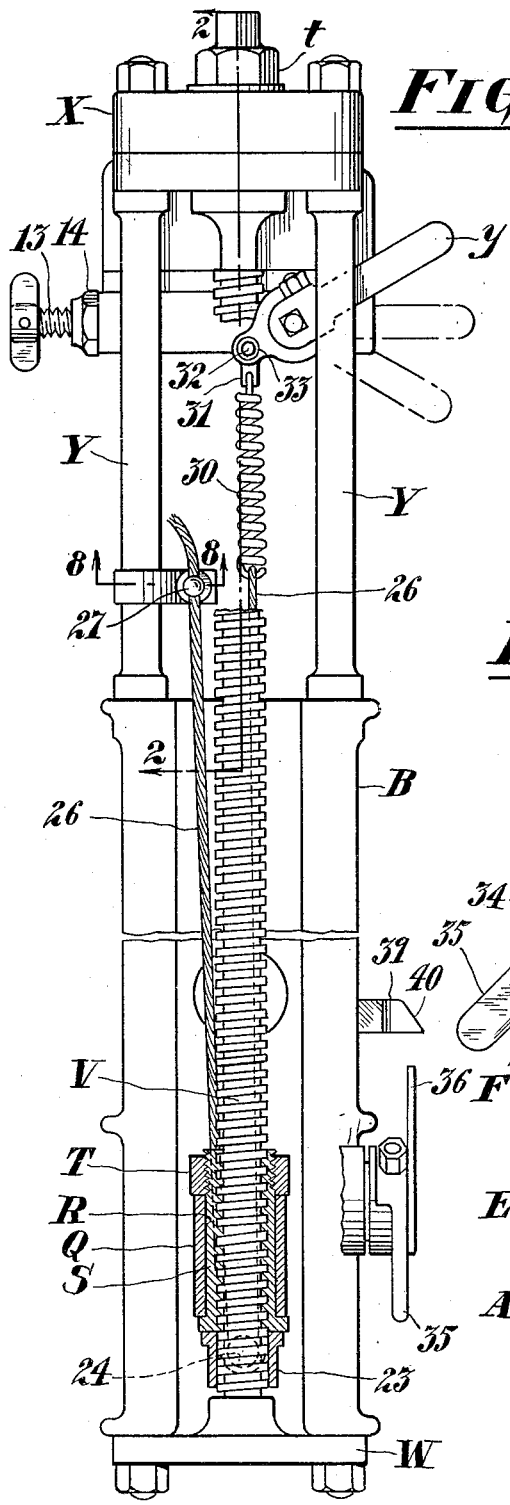
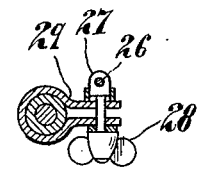
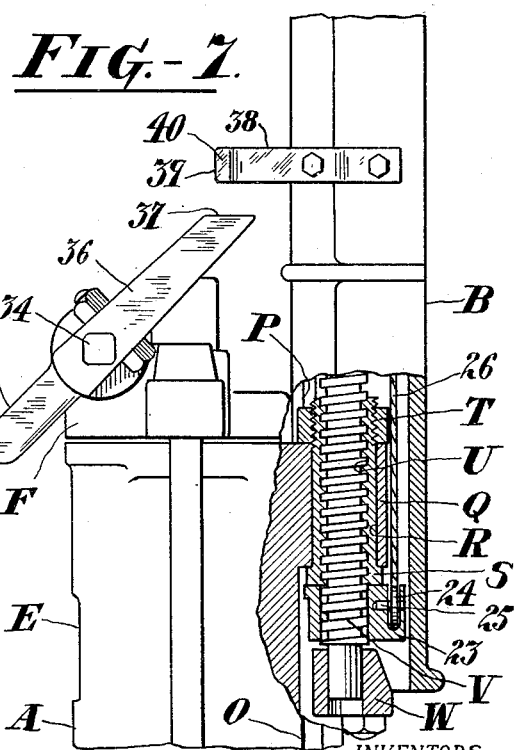

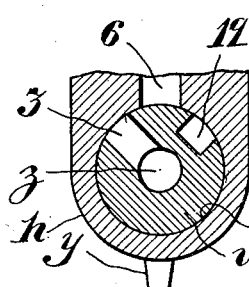
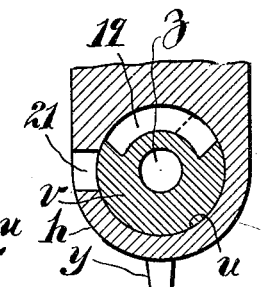
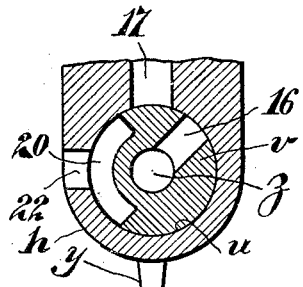
FIG.-9.  FIG.-12.  FIG.-15.
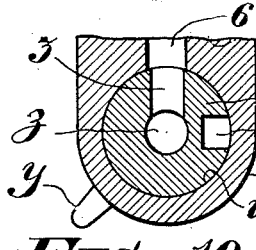
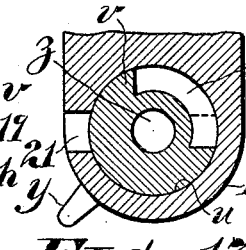
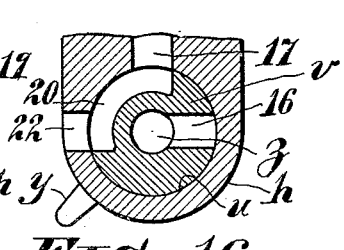
FIG.-10.  FIG.-13.  FIG.-16.
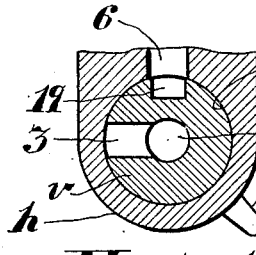
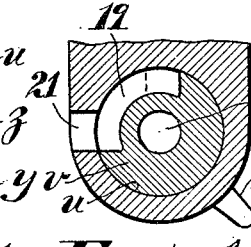
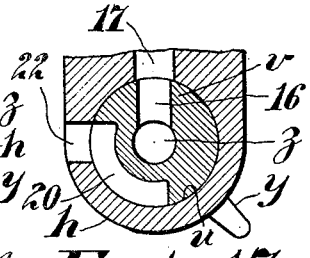
FIG.-11.  FIG.-14.  FIG.-17.
INVENTORS
William A. Smith, Sr.
And, Floyd H. Thomas
BY
THEIR ATTORNEY Patented Dec. 29, 1931

1,838,459

UNITED STATES PATENT OFFICE

WILLIAM A. SMITH, SR., OF PHILLIPSBURG, NEW JERSEY, AND FLOYD H. THOMAS, OF MILAN, PENNSYLVANIA, ASSIGNORS TO INGERSOLL-RAND COMPANY, OF JERSEY CITY, NEW JERSEY, A CORPORATION OF NEW JERSEY

FEEDING DEVICE

Application filed August 16, 1928. Serial No. 299,974.

This invention relates to rock drills, but more particularly to a feeding device for fluid actuated rock drills of the drifter type.

A few of the objects are to maintain a uniform feeding pressure on the working implement, to facilitate the operation of retracting the drill after the drill hole has been completed, to enable the feeding device to be automatically reversed after the drill reaches the foremost limit of its travel in its shell, and to render the drilling mechanism practically automatic in its operation, thus eliminating the necessity of constant attention on the part of the drill operator.

Other objects will be in part obvious and in part pointed out hereinafter.

In the drawings illustrating one form which the invention may assume in practice and in which similar reference characters refer to similar parts, Figure 1 is a perspective view of a rock drill and its shell equipped with a feeding device constructed in accordance with the practice of the invention and showing the drilling mechanism mounted on a quarry bar, Figure 2 is a longitudinal section of the feeding device taken through Figure 6 on the line 2—2 looking in the direction indicated by the arrows, Figure 3 is a sectional elevation of the gear train connecting the motor to the feed screw and taken through Figure 2 on the line 3—3 looking in the direction indicated by the arrows, Figure 4 is a transverse sectional view of the gear motor taken through Figure 2 on the line 4—4 looking in the direction indicated by the arrows, Figure 5 is a transverse sectional elevation of the pressure fluid governing device of the motor taken through Figure 2 on the line 5—5 looking in the direction indicated by the arrows, Figure 6 is a plan view of the shell and the motor illustrating the manner in which the motor throttle valve may be reversed, Figure 7 is a side elevation, partly broken away, of a portion of a drill and the shell showing a detail, Figure 8 is a transverse view through Figure 6 taken on the line 8—8 looking in the direction indicated by the arrows, Figures 9 to 11 inclusive are sectional elevations of the throttle valve showing the throttle valve in various positions for controlling the supply of pressure fluid to the motor for rotating it in one direction and taken on the line 9—9 of Figure 5 looking in the direction indicated by the arrows, Figures 12 to 14 inclusive are similar views taken on the line 12—12 of Figure 5 looking in the direction indicated by the arrows, and Figures 15 to 17 inclusive are similar views showing the throttle valve in various positions for controlling the supply of pressure fluid to the motor for operating the motor in a reverse direction.

Referring to the drawings and at first more particularly to Figure 1 in which the general arrangement of the drilling mechanism is shown, A represents a rock drill in this instance of the drifter type having a shell B which is secured to a suitable clamping device C mounted on a quarry bar D. The rock drill A comprises a cylinder E and back and front heads F and G respectively which are clamped to the drill by means of spring pressed side bolts H. In the front head G is a drill steel J for drilling holes K in the work such as rock L.

The cylinder E is provided with the customary guides O which are in slidable engagement with guideways P of the shell B so that the rock drill A may be actuated longitudinally of the shell B whereby it is supported. Suitable and well known means are provided for inducing such movement of the rock drill A with respect to the shell B. The cylinder E is accordingly provided with a lug Q in which is formed an aperture R for the reception of a feed screw nut S which is held in the lug Q by means of a nut T threaded on the rearward end of the feed screw nut.

The feed screw nut S is provided with internal threads U for cooperation with a feed screw V supported at its front end by a plate W bolted to the front end of the shell B. This is the usual construction of devices of this type and, as will be readily understood, by rotating the feed screw in one direction the rock drill A will be advanced towards the work to assure the delivery of the full force of the blows of the hammer piston (not shown) against the working implement, and by rotating the feed screw V in the opposite direction the rock drill A may be retracted from the work.

Heretofore in devices of this type, it has been customary to equip the feed screw V with a crank handle to manually rotate the feed screw. This arrangement made it necessary for the operator to maintain a constant grip on the crank handle during the drilling operation, which is objectionable for various reasons. The principal one of which is that the operator is constantly subjected to the terrific vibration set up by the rock drill, and another is that whenever the operator relaxes pressure on the crank handle, the drilling efficiency is considerably reduced. The present invention contemplates the elimination of manually operable means, such as a crank handle, and to this end the drill is provided with a motor designated generally by X and mounted on the rearward ends of standards Y secured to the shell B.

The motor X in this instance comprises a cylinder Z in which are disposed the motor gears $b$ and $c$. A plate or head $d$ forms a closure for the rearward end of the cylinder Z and also one side of a gear box $e$. The plate $d$ extends in an upwardly direction and is provided with a bore $f$ to form a bearing for the rearward portion of the feed screw V. The gear box $e$ may be secured to the plate $d$ by means of bolts $g$ which extend through the gear box $e$, the plate $d$ and the cylinder Z and also through a valve chest $h$ which forms in this instance a closure for the opposite or front end of the cylinder Z.

The gear box $e$ serves as a housing for a gear train used for transmitting the rotary motion of the motor to the feed screw. The gear train in this instance comprises a pinion $j$ which may be an integral portion of a shaft $o$ to which the gear $b$ is keyed. A gear $p$ is keyed to the feed screw V and an idler gear $q$ is interposed between the pinion $j$ and the gear $p$ for transmitting the movement of the motor to the feed screw. In the present instance the idler gear $q$ is mounted on a shaft $r$ seated in the gear box $e$ with one end and with its other end in the plate $d$. The idler gear $q$ is preferably loosely mounted on the shaft $r$ and is held against endwise movement by the gear box $e$ and the plate $d$.

In the construction shown, the feed screw V is provided with a threaded end $s$ for the reception of a nut $t$ which extends through the gear box and bears against the gear $p$. The valve chest $h$ is provided with a cylindrical chamber $u$ in which is disposed a throttle valve $v$ for controlling the admission of pressure fluid to the motor, such pressure fluid being conveyed to the chamber $u$ by means of a conduit $w$ leading from a suitable source of supply. The throttle valve $v$ is preferably of cylindrical shape and has a stem $x$ which extends through the end of the valve chest to receive a throttle lever $y$ whereby the throttle valve $v$ may be manipulated.

Within the throttle valve $v$ is formed a passage $z$ which communicates with an inlet passage 2 in the valve chest through a port 3 in the wall of the throttle valve. The inlet passage 2 is intended to convey pressure fluid to the motor for rotating the gears in the direction for advancing the rock drill A towards the work.

In the present instance the inlet passage 2 leads to a valve chamber 4 in which is disposed a governing valve 5 having a passage 6 which may communicate with the passage 2 through ports 7. The passage 6 leads longitudinally through and to the front end of the governing valve 5 so that when the governing valve 5 is in its open position, the pressure fluid may flow through ports 8 in the front end of the valve 5 and thence through a passage 10 leading from the inner end of the valve chamber 4 to the motor cylinder Z.

It will thus be seen that during the normal operation of the motor, the front end of the governing valve 5 will be constantly exposed to pressure fluid. In order to normally maintain the governing valve 5 in the open position a compression spring 11 is disposed in the rearward end of the valve chamber 4 to exert a sufficient pressure against the rearward end of the valve to overcome that exerted by the pressure fluid acting against the front end of the valve.

The tension of the spring 11 may be varied for different values of pressure fluid utilized for actuating the motor. To this end the spring 11 is seated against an adjustable valve seat 12 which may be an integral portion of the thumb screw 13 threaded into the plug 14 which forms a closure for the rearward end of the valve chamber 4. A vent 15 may be provided at the rearward end of the valve chamber 4 to prevent the accumulation of pressure fluid in the rearward end of the said valve chamber.

In order to enable pressure fluid to be introduced to the opposite sides of the gears $b$ and $c$ for rotating the motor in a reverse direction, the throttle valve $v$ is provided with a port 16 adapted to register with a passage 17 leading direcly from the valve chamber $u$ to the cylinder Z, and the pressure fluid flowing into the cylinder Z for operating the gears $b$ and $c$ in either direction is exhausted to the atmosphere through suitable exhaust ports 18 in the cylinder Z. Preferably the throttle valve is provided in its periphery with suitable grooves 19 and 20 adapted to afford communication between the inlet passages 2 and 17 respectively and with exhaust ports 21 and 22 leading to the atmosphere.

Means are provided for automatically reversing the direction of rotation of the motor when the rock drill A has reached the foremost limit of its travel with respect to the shell B, or at any other desired point within the range of travel of the rock drill in the shell. To this end a sleeve 23 is disposed loosely on the feed screw V and therefore directly in line with the feed nut S. The sleeve 23 is preferably provided with a sheave 24 pivoted on a shaft 25 which is seated in the sleeve 23. A cable 26 is trained over the sheave 24 and extends with one end through an eye bolt 27 having a thumb nut 28 whereby the cable 26 may be firmly secured to a clamp 29 disposed in this instance on a standard Y. The eye bolt 27 and the nut 28 also serve to secure the clamp 29 to the standard.

On the opposite end of the cable 26 is secured a tension spring 30 which connects the cable 26 with a link 31 pivoted to the throttle lever $y$ by means of a pin 32. The pin 32 may be either riveted or otherwise suitably secured to the throttle lever $y$ and has a projection 33 which extends into the path of the nut T or any other suitable element associated with the lug Q of the rock drill cylinder.

The rock drill A is provided with the usual throttle valve, only the stem 34 of which is shown. The throttle valve is preferably disposed in the back head F and has a throttle lever 35 whereby the throttle valve may be manipulated. A flexible plate 36 is in this instance secured to the stem 34 of the throttle valve and has an inclined end surface 37 adapted to engage an arm 38 bolted to the shell B for rotating the throttle valve from an open to a closed position.

The arm 34 extends in an upwardly direction and has a lateral integral projection 39 which lies in the path of travel of the flexible plate 36 so that when the rock drill A travels in a rearwardly direction, the projection 39 will engage the plate 36 to rotate the throttle valve.

On the free end of the projection 39 is formed an inclined surface 40 which also lies across the path of travel of the flexible plate 36 so that when the rock drill is travelling in a forwardly direction with respect to the shell B, the said flexible plate 36 will be readily guided past the arm 38 without affecting the position of the throttle valve 34.

The operation of the device is as follows: After the throttle valve 34 of the rock drill A has been opened to the position indicated in Figure 7 to start the percussive element of the drilling mechanism, the throttle valve $v$ may be rotated from its neutral position illustrated in Figures 9, 12, and 15 to the open position illustrated in Figures 10, 13, and 16. Pressure fluid will then flow through the inlet passage 2, the passage 6 in the governing valve 5 and through the passage 10 into the cylinder Z to rotate the gears $b$ and $c$ and the associated gear train and the feed screw V in the direction necessary for advancing the rock drill A towards the work. While the motor is rotating in a direction to feed the rock drill A forwardly, the exhaust groove 20 in the throttle valve $v$ will establish communication between the inlet passage 17 and the exhaust port 22 to effect the escape of any pressure fluid which may accumulate in the cylinder Z adjacent the passage 17.

To start the motor, the throttle valve $v$ is manually opened. The pressure fluid thus admitted into the cylinder Z will constantly rotate the gears $b$ and $c$ to urge the drill A forwardly and thus assure the correct position of the percussive element with respect to the drill steel J so that as the drill steel J penetrates the rock, the drill A will constantly occupy a position with respect to the drill steel in which the utmost effect may be obtained from the blows of the hammer piston.

As the rock drill A approaches the front end of the shell B, the feed nut S or such other element as may be provided will engage the sleeve 23 and carry said sleeve in a forwardly direction. In this way the cable 26 will be gradually tightened and a tension will be placed in the spring 30. After the tension in the spring 30 becomes sufficiently great to overcome the resistance to rotation of the throttle valve $v$, the said spring 30 will contract and reverse the throttle valve $v$ to another open position illustrated in Figures 11, 14 and 17. This occurs at about the time the rock drill has reached the foremost limit of its travel in the shell B.

Reversal of the throttle valve $v$ will bring the port 16 into registry with the inlet passage 17 and the port 3 out of registry with the inlet passage 2. The groove 19 will then occupy the position previously occupied by the port 3 so that any pressure fluid which may exist in the cylinder Z adjacent the inlet passage 10 may escape to the atmosphere without hindering the free rotation of the gears $b$ and $c$.

After the throttle valve $v$ has been reversed in the manner described, pressure fluid will flow through the port 16 into the inlet passage 17 and into the cylinder Z to rotate the gears $b$ and $c$ and thus also the feed screw V in a direction for retracting the rock drill A from the work. This reversal of the feeding device takes place automatically, it being necessary only to manually rotate the throttle valve $v$ for setting the motor in operation.

The motor will then continue to operate in a reverse direction until the nut T moves into contact with the projection 33 of the pin 32 and the throttle valve $v$ will then be gradually closed to cut off the supply of pressure fluid to the motor.

During the forward travel of the drill in the shell B, the flexible plate 36 will be carried against the inclined surface 40 of the arm 38 and the plate 36 will thus be guided past the arm without in any way affecting the position of the throttle valve 34. As will be observed, the arm 38 is so located on the shell B that the plate 36 is merely carried free of the arm before reversal of the motor takes place. As the drill A starts to move in a rearward direction, the inclined surface 37 of the plate 36 is engaged by the projection 39 of the arm 38 and, as a result, the throttle valve 34 is quickly rotated to its closed position, thus stopping the operation of the rock drill A as soon as the drill steel is loosened in the drill hole so that it may be freely retracted therefrom.

When the drilling mechanism is functioning in the normal manner, the governing valve 5 occupies a position in the forwardmost part of the chamber 4 and is pressed to this position by the spring 11 so that pressure fluid may pass freely into the inlet passage 2 through the governing valve into the passage 10.

With the tension of the spring 11 properly adjusted so that its force is slightly less than the value of the pressure fluid at its source, the governing valve will remain stationary in the forward end of the valve chamber 4, since, owing to the drop in pressure occasioned by the consumption of the motor, the value of the pressure fluid acting against the front end of the valve v will be somewhat below the nominal line pressure. In other words, the tension of the spring should be so adjusted that the spring will yield only when the pressure acting against the front end of the valve reaches full line pressure. In this way, when excessive or undue resistance to rotation is encountered by the drill steel so that it becomes stuck in the drill hole and at which time the feed screw motor will be slowed down considerably since the drill steel will then cease penetrating the rock, the pressure fluid acting against the front or innermost end of the governing valve 5 will attain the nominal pressure and will gradually move the governing valve rearwardly in the chamber 4 until the ports 7 are moved out of communication from the inlet passage 2. The rotation motor will then remain idle until the hammer piston in the rock drill has again freed the drill steel, it being understood, of course, that the hammer piston is constantly delivering blows against the drill steel which is the case. After the drill steel has been freed sufficiently so that normal drilling may again be resumed, the pressure fluid acting against the front end of the governing valve will again drop slightly below line pressure as well as below the pressure exerted by the spring 11, and the governing valve will then again be restored to its initial position by the spring.

The advantages that arise from this feature, particularly where the drill is mounted on a quarry bar or similar support, are that the motor ceases rotating when the drill steel is stuck or unable to further penetrate the rock and thus prevents the raising of the quarry bar or such other support from the desired position.

As has been before stated, the tension of the spring 11 may be varied in accordance with the different pressures at which the drill may be operated or in accordance with the weight of the drilling mechanism and the support whereon it is mounted. Therefore, when the drill and the motor are being operated by pressure fluid of a certain value, the thumb screw 13 may be so adjusted that the motor will cease operating at higher pressures. This may be accomplished by screwing the thumb screw 13 in the direction of the governing valve. If, on the other hand, pressures of lower value are being used for operating the drill and the motor, the thumb screw 13 may be threaded away from the valve 5 and the governing valve 5 will then be actuated to cut off communication between the motor and the inlet passage 2 before the motor may rotate sufficiently to raise the drilling mechanism.

From the foregoing, it will be seen that after the motor and the rock drill have been set in operation, both will continue to operate under normal drilling conditions until the hole has been drilled and the rock drill has again been retracted to its initial position. In other words, all of the various operations, such as reversing the feeding device and stopping the rock drill, are performed automatically. This is a very desirable feature since it enables one operator to operate a plurality of drills at the same time, it being merely necessary to change the drill steels and set the device in operation.

We claim:

1. In a feeding device for rock drills, the combination of a rock drill and a shell, a feed screw operably connected to the rock drill and the shell, a reversible pressure fluid actuated rotary motor connected to rotate the feed screw for actuating the rock drill relatively to the shell, a throttle valve for controlling the admission of pressure fluid to the motor, a sleeve disposed slidably on the feed screw, and means connected to the throttle valve and the sleeve and actuated by the rock drill for reversing the throttle valve and thus also the direction of rotation of the motor.

2. In a feeding device for rock drills, the combination of a rock drill and a shell, a feed screw operably connected to the rock drill and the shell, a reversible pressure fluid actuated rotary motor connected to rotate the feed screw for actuating the rock drill relatively to the shell, a throttle valve for controlling the admission of pressure fluid to the motor, a lever on the throttle valve for manually opening the throttle valve to rotate the motor in one direction, and flexible means connected to the throttle valve and actuated by the rock drill for automatically reversing the throttle valve and thus also reversing the direction of rotation of the motor.

3. In a feeding device for rock drills, the combination of a rock drill and a shell, a feed screw operably connected to the rock drill and the shell, a reversible pressure fluid actuated rotary motor connected to rotate the feed screw for actuating the rock drill relatively to the shell, a throttle valve adapted to be manually rotated to an open position for rotating the motor in one direction, a sleeve on the feed screw adapted to be actuated by the rock drill, and a cable connected to transmit the movement of the sleeve to the throttle valve to rotate said throttle valve in a reverse direction.

4. In a feeding device for rock drills, the combination of a rock drill and a shell, a feed screw operably connected to the rock drill and the shell, a reversible pressure fluid actuated rotary motor connected to rotate the feed screw for actuating the rock drill relatively to the shell, a throttle valve adapted to be manually rotated to an open position for rotating the motor in one direction, a sleeve on the feed screw, a cable operatively connected to the sleeve, and a spring interposed between the cable and the throttle valve and adapted to be placed under a tension when the rock drill forces the sleeve toward the end of the feed screw to reverse the throttle valve to another open position and thus also reverse the direction of rotation of the motor to retract the rock drill.

5. In a feeding device for rock drills, the combination of a rock drill and a shell, a feed screw operably connected to the rock drill and the shell, a reversible pressure fluid actuated rotary motor connected to rotate the feed screw for actuating the rock drill relatively to the shell, a throttle valve adapted to be manually rotated to an open position for rotating the motor to advance the rock drill, a sleeve slidable on the feed screw, a cable connected at one end to the shell and extending through the sleeve, and a spring connecting the other end of the cable to the throttle valve and adapted to be placed under a tension when the rock drill engages the sleeve so that as the rock drill approaches the front end of the shell the spring will cause the throttle valve to rotate to another open position to reverse the direction of rotation of the motor.

6. In a feeding device for rock drills, the combination of a rock drill and a shell, a feed screw operably connected to the rock drill and the shell, a reversible pressure fluid actuated rotary motor connected to rotate the feed screw for actuating the rock drill relatively to the shell, a throttle valve adapted to be manually rotated to an open position for rotating the motor to advance the rock drill, a sleeve slidable on the feed screw, a cable connected at one end to the shell and extending through the sleeve, a spring connecting the other end of the cable to the throttle valve and adapted to be placed under a tension when the rock drill engages the sleeve so that as the rock drill approaches the front end of the shell the spring will cause the throttle valve to rotate to another open position to reverse the direction of rotation of the motor, and means for varying the length of the cable to adjust the position of the sleeve.

7. In a feeding device for rock drills, the combination of a rock drill and a shell, a feed screw operably connected to the rock drill and the shell, a reversible motor connected to rotate the feed screw for actuating the rock drill longitudinally of the shell, a throttle valve for controlling the admission of pressure fluid into the rock drill, a flexible plate on the throttle valve, and an arm on the shell to form an abutment for the plate during the rearward movement of the drill to close the throttle valve upon the reversal of the motor for retracting the drill, said arm having an inclined surface to guide the plate past the arm as the rock drill approaches the front end of the shell.

In testimony whereof we have signed this specification.

WILLIAM A. SMITH, Sr.
FLOYD H. THOMAS.